(12) United States Patent
Li

(10) Patent No.: US 10,586,125 B2
(45) Date of Patent: Mar. 10, 2020

(54) LINE REMOVAL METHOD, APPARATUS, AND COMPUTER-READABLE MEDIUM

(71) Applicant: KONICA MINOLTA LABORATORY U.S.A., INC., San Mateo, CA (US)

(72) Inventor: Bo Li, Stanford, CA (US)

(73) Assignee: KONICA MINOLTA LABORATORY U.S.A, INC., San Mateo, CA (US)

( * ) Notice: Subject to any disclaimer, the term of this patent is extended or adjusted under 35 U.S.C. 154(b) by 85 days.

(21) Appl. No.: 15/719,343

(22) Filed: Sep. 28, 2017

(65) Prior Publication Data
US 2019/0095743 A1 Mar. 28, 2019

(51) Int. Cl.
*G06K 9/34* (2006.01)
*G06F 17/24* (2006.01)
*G06K 9/00* (2006.01)
*G06K 9/46* (2006.01)

(52) U.S. Cl.
CPC ........... *G06K 9/346* (2013.01); *G06F 17/245* (2013.01); *G06K 9/00449* (2013.01); *G06K 9/342* (2013.01); *G06K 9/4638* (2013.01); *G06K 2209/01* (2013.01)

(58) Field of Classification Search
CPC ..... G06K 9/346; G06K 9/0049; G06F 17/245
See application file for complete search history.

(56) References Cited

U.S. PATENT DOCUMENTS 8,452,133 B2   5/2013  Oba
9,286,541 B1 * 3/2016  Natarajan ............ G06K 9/4642

* cited by examiner

*Primary Examiner* — Ruiping Li
(74) *Attorney, Agent, or Firm* — Squire Patton Boggs (US) LLP

(57) ABSTRACT

Complete removal of an underline which intersects a character may cause problems in a subsequent character recognition or conversion process, when parts of the character which coincided with the underline are also removed. To help reduce the problems, parts of underline may be removed from an image while parts of the character that coincide with the underline are maintained in the image. Areas where the character coincides with the underline are defined from a reduced version of the underline. When the underline is removed, the areas where the character coincide with the underline are maintained in a second image. The second image may then be subjected to a character recognition or conversion process with potentially fewer problems.

20 Claims, 13 Drawing Sheets

Section Three: Need for Program/Project – (limit response to 1 ½ pages)

1. Please specify how the requested funds will be applied.

2. Supply evidence that your [organization] OR your [program/project] does not duplicate services provided elsewhere in the region you serve.

3. Identify the community need your program/project will address.

4. How was the need determined?

5. Discuss the results of your need assessment.

Section Four: Evaluation - (limit your response to 1 page)

1. How will you evaluate the success of your program/project? *Or*, of your organization's overall goals for the operating year for which you seek funding?

Section Five: Administrative - (limit response to 1 ½ pages)

1. How have revenue streams to your organization been impacted by recent local, state and/or nationwide financial developments?

2. What steps have you taken to manage expenses and revenue?

3. What will be different about how you operate during the next year?

4. With what degree of certainty does your board believe that the agency is sustainable over the next 2-3 years? On what basis?

5. What impact would a partial award have on your proposal?

*NOTE:* See next page for  C. Required Attachments

Revised for use in 2015

FIG. 2

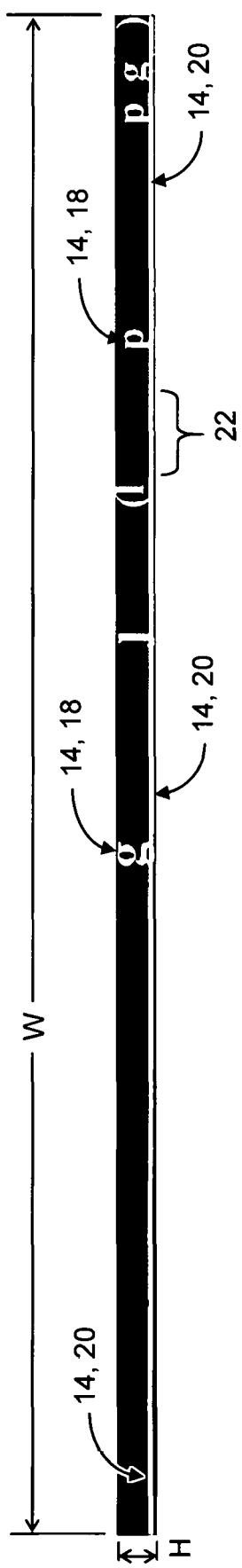
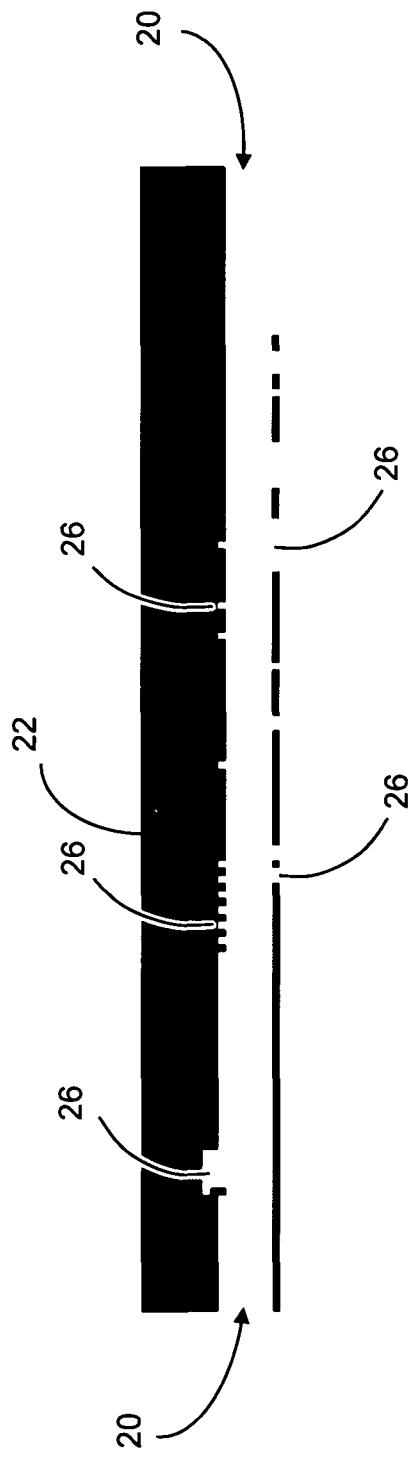
FIG. 3
FIG. 4

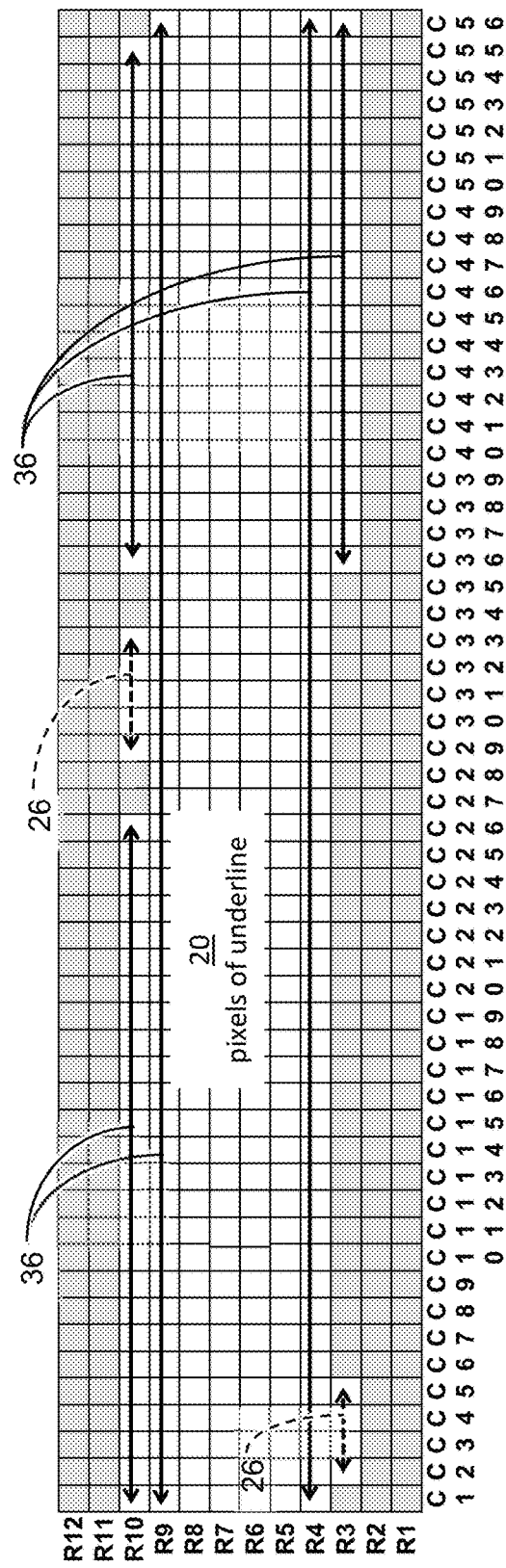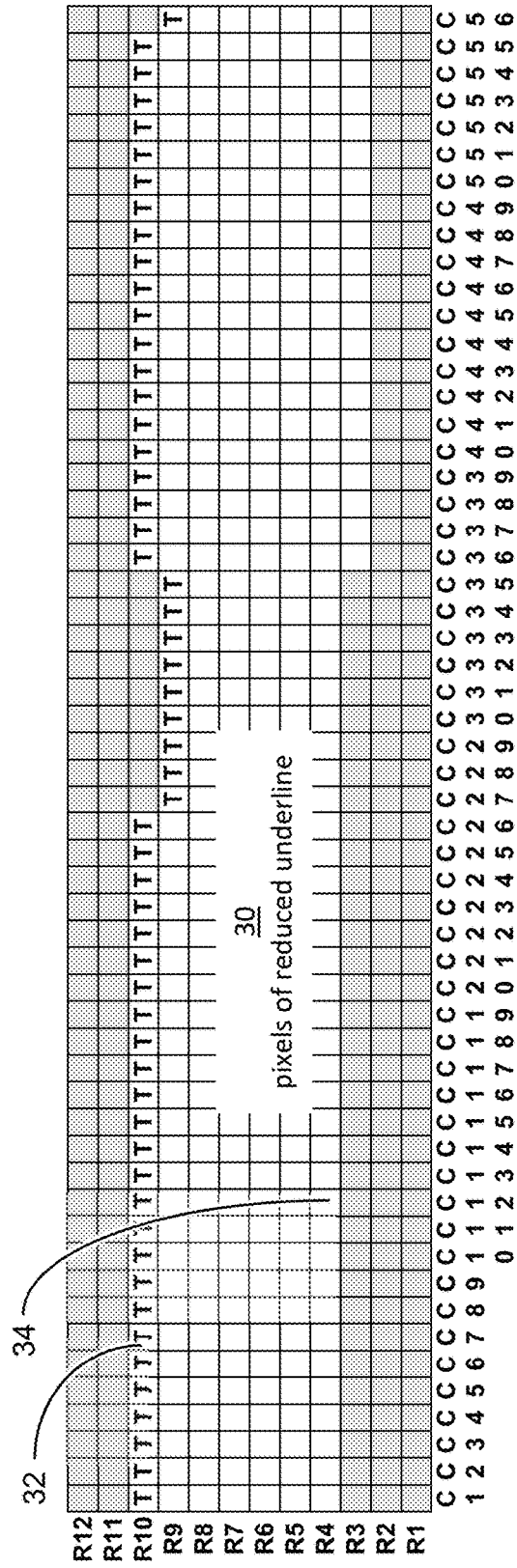
FIG. 12
FIG. 13

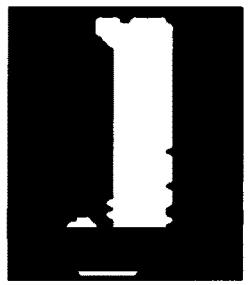
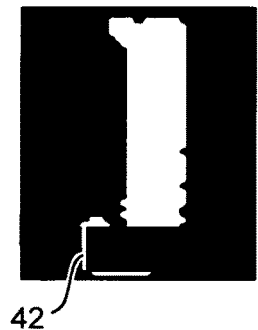
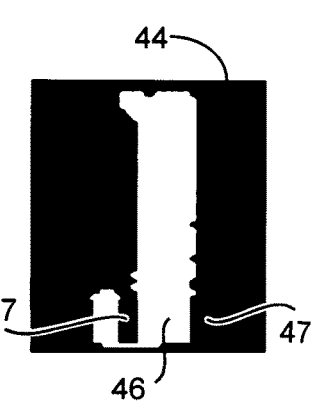
FIG. 14A  FIG. 14B  FIG. 14C  FIG. 14D
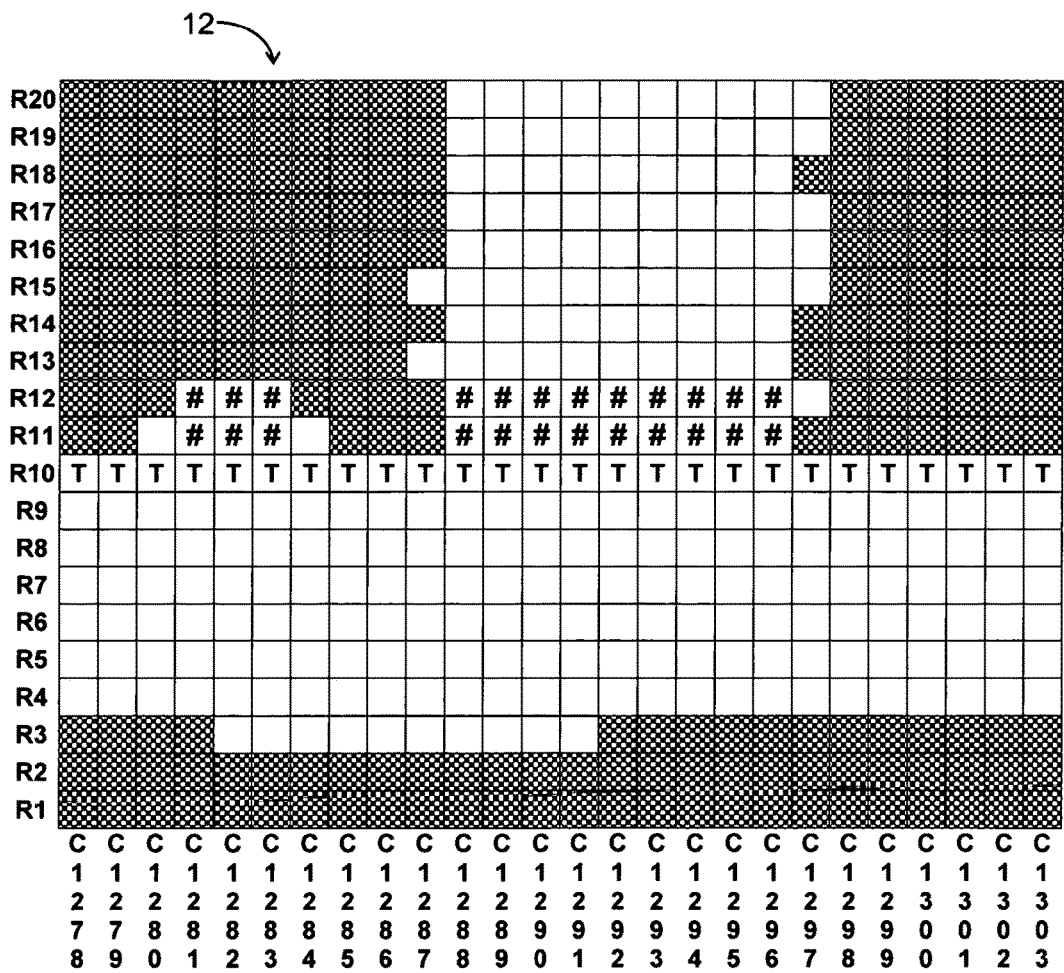
FIG. 15

LINE REMOVAL METHOD, APPARATUS, AND COMPUTER-READABLE MEDIUM

FIELD

This disclosure relates generally to image processing and, more particularly, to removal of an underline from underlined text.

BACKGROUND

Document image processing often involves a character recognition process, such as OCR, that identifies objects in the image as specific characters. Character recognition processes allow an image to become machine readable. They may also facilitate conversion of the image into an editable format that may be used in a word processing program and the like. Some document images may include non-text objects, such as charts, tables, and underlines that may reduce the efficiency and accuracy of a character recognition process or conversion process. Thus, it can be advantageous to remove these non-text objects in advance. There is a need for a method, apparatus, and program that can remove charts, tables, and underlines with greater efficiency. This can be used to index and access large repositories of electronic documents according their contents. This can also enable processing of electronic documents with reduced computational load.

SUMMARY

Briefly and in general terms, the present invention is directed to a method, apparatus, and non-transitory computer readable medium for underline removal.

In aspects of the invention, a method comprises receiving a first image containing a plurality of connected components, the plurality of connected components comprising a text-underline connected component, the text-underline connected component comprising foreground pixels defining a character that intersects an underline, the underline comprising a row of foreground pixels that does not satisfy a minimum length requirement. The method also comprises establishing a reduced underline, which is a partial copy of the underline, that excludes the row of foreground pixels, there being a plurality of column positions along the reduced underline, the reduced underline comprising a top pixel and a bottom pixel at each of the column positions. The method also comprises defining, in the reduced underline, an intersection area at which the character in the text-underline connected component coincides with the reduced underline. The method also comprises generating a second image containing a de-underlined connected component, the de-underlined connected component comprising foreground pixels corresponding in position to the intersection area in the reduced underline, the de-underlined connected component surrounded by background pixels corresponding in position to areas in the reduced underline adjacent to the intersection area.

In aspects of the invention, an apparatus comprises a processor and a memory device in communication with the processor. The memory stores instructions and the processor is configured to create an image encoded with character information by performing a process according to the stored instructions. The process performed by the processor comprises receiving a first image containing a plurality of connected components, the plurality of connected components comprising a text-underline connected component, the text-underline connected component comprising foreground pixels defining a character that intersects an underline, the underline comprising a row of foreground pixels that does not satisfy a minimum length requirement. The process performed by the processor also comprises establishing a reduced underline, which is a partial copy of the underline, that excludes the row of foreground pixels, there being a plurality of column positions along the reduced underline, the reduced underline comprising a top pixel and a bottom pixel at each of the column positions. The process performed by the processor also comprises defining, in the reduced underline, an intersection area at which the character in the text-underline connected component coincides with the reduced underline. The process performed by the processor also comprises generating a second image containing a de-underlined connected component, the de-underlined connected component comprising foreground pixels corresponding in position to the intersection area in the reduced underline, the de-underlined connected component surrounded by background pixels corresponding in position to areas in the reduced underline adjacent to the intersection area.

In aspects of the invention, a non-transitory computer-readable medium has stored thereon computer readable instructions that, when executed by a processor of an apparatus, cause the apparatus to perform a process for removing underlines from an image. The process performed by the apparatus comprises receiving a first image containing a plurality of connected components, the plurality of connected components comprising a text-underline connected component, the text-underline connected component comprising foreground pixels defining a character that intersects an underline, the underline comprising a row of foreground pixels that does not satisfy a minimum length requirement. The process performed by the apparatus also comprises establishing a reduced underline, which is a partial copy of the underline, that excludes the row of foreground pixels, there being a plurality of column positions along the reduced underline, the reduced underline comprising a top pixel and a bottom pixel at each of the column positions. The process performed by the apparatus also comprises defining, in the reduced underline, an intersection area at which the character in the text-underline connected component coincides with the reduced underline. The process performed by the apparatus also comprises generating a second image containing a de-underlined connected component, the de-underlined connected component comprising foreground pixels corresponding in position to the intersection area in the reduced underline, the de-underlined connected component surrounded by background pixels corresponding in position to areas in the reduced underline adjacent to the intersection area.

The features and advantages of the invention will be more readily understood from the following detailed description which should be read in conjunction with the accompanying drawings.

BRIEF DESCRIPTION OF THE DRAWINGS

FIG. 2 shows an example first image to be processed according to the method.

FIG. 3 shows an example text-underline connected component from of FIG. 2.

FIG. 4 shows a portion of the text-underline connected component of FIG. 3.

FIG. 12 shows pixels of a segment of an example underline.

FIG. 13 shows pixels of a segment of an example reduced underline that corresponds to the underline segment of FIG. 12.

FIGS. 14A-14D show a portion of the first image of FIG. 1 and illustrates an example process of generating a second image from the first image by restoring intersection areas where a reduced underline coincides with the character j.

FIG. 15 shows pixels at the lower part of FIG. 14A.

DETAILED DESCRIPTION

As used herein, the term "image" encompasses any one or a combination of photographs, pictures, illustrations, characters, and other objects. For example, an image can be a scan of either a handwritten document or a page from a book.

As used herein, the term "characters" refers to characters that can be alphanumeric, phonetic, semantic, and the like. The term encompasses mathematical symbols. The term encompasses Japanese characters, Chinese characters, Arabic characters, and other characters used in written language.

As used herein, a grayscale image is an image in which each one of all pixels in the image has one of several available values representing intensity information. For example, a grayscale image can be an image in which pixels are white, black, or one of various shades of gray between white and black. Each pixel is represented by a grayscale value ranging from a minimum value often representing black (lowest intensity) to a maximum value often representing white (highest intensity). Values between the minimum and maximum values represent various shades of gray.

In a grayscale image, foreground objects (such as lines, graphs, characters, and the like) may be represented by black and dark gray pixels. If so, these pixels may be referred to as foreground pixels, and white pixels and possibly light gray pixels may be referred to as background pixels. Also the reverse is possible, in that foreground objects may be represented by white and possibly light gray pixels. If so, these pixels may be referred to as foreground pixels, and black pixels and dark gray pixels may be referred to as background pixels.

As used herein, a binary image is a bi-tonal image in which each one of all pixels in the image has one of only two available values. For example, a binary image can be a black and white image in which pixels have one of two available values, namely a value corresponding to white and a value corresponding to black.

In a binary image, foreground objects may be represented by black pixels. If so, black pixels may be referred to as foreground pixels, and white pixels may be referred to as background pixels. Also the reverse is possible, in that foreground objects may be represented by white pixels. If so, white pixels may be referred to as foreground pixels, and black pixels may be referred to as background pixels. In addition, binary color schemes other than black-white are possible.

Figure 1:
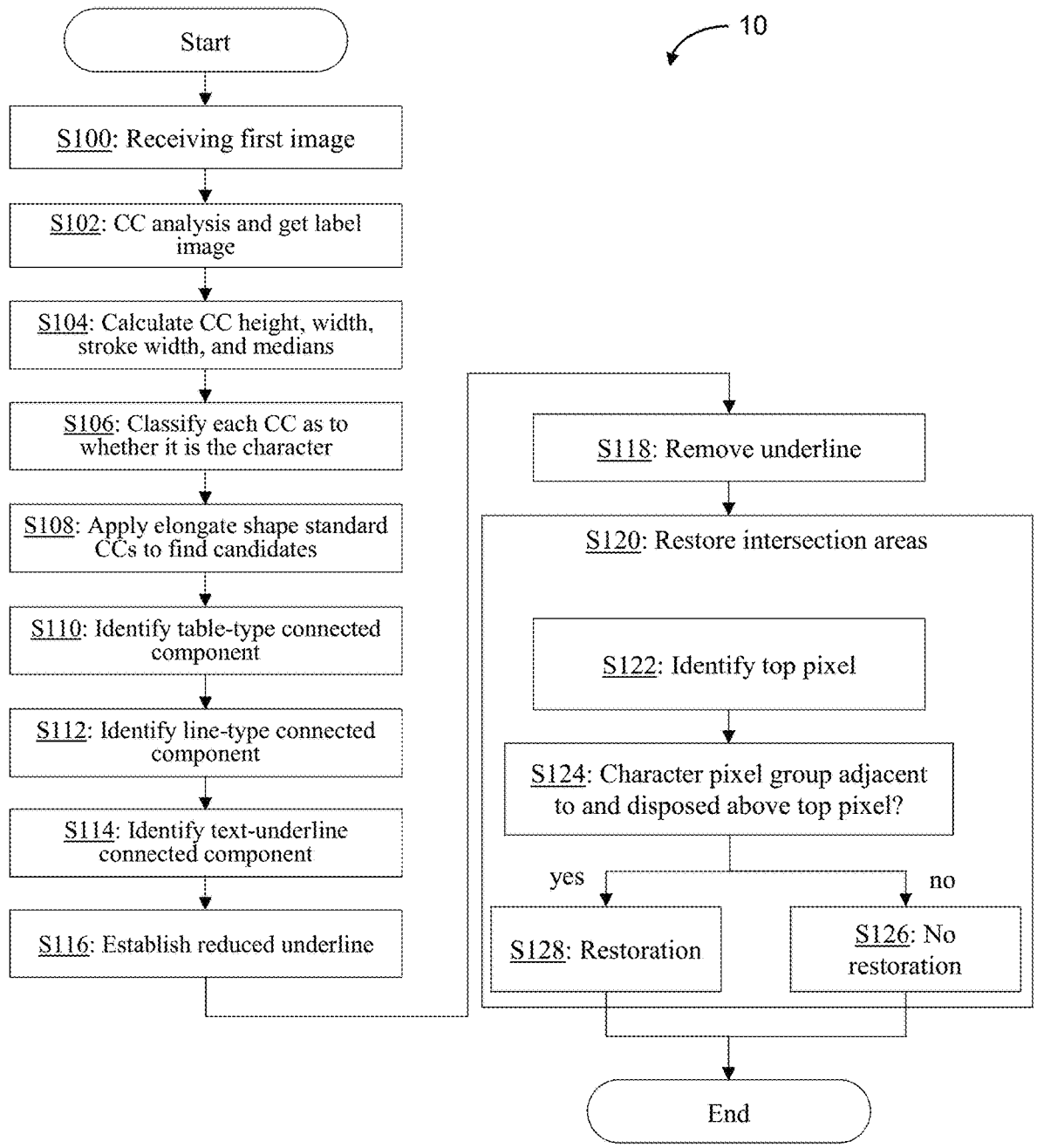
FIG. 1 is a flow diagram showing an example method for line removal.

Referring now in more detail to the example drawings for purposes of illustrating aspects of the invention, wherein like reference numerals designate corresponding or like elements among the several views, there is shown in FIG. 1 example method 10 for line removal. The method begins with a first image containing one or more lines, and then generates a second image without the lines.

At block S100, a first image is received. FIG. 2 shows example first image 12 which contains text. Foreground objects are represented by light colored pixels. Some of the characters in the text are underlined. Some of the characters are contained with a box or table. First image 12 contains a plurality of connected components. One of the plurality of connected components is a text-underline connected component.

FIG. 3 shows example text-underline connected component 14 located at region 16 in FIG. 2. Text-underline connected component 14 comprises foreground pixels defining characters 18 that intersect and are thus connected to underline 20. In this example, the foreground pixels are white pixels. Only a few of the characters are labeled in the figure for simplicity.

FIG. 4 shows a close-up of portion 22 of text-underline connected component 14. Underline 20 comprises various rows 26 of foreground pixels (horizontal rows white pixels in this example) that do not satisfy a minimum length requirement (an example for a first minimum length requirement). Only a few of these rows are labeled in the figure for simplicity. The minimum length requirement can be expressed as a threshold length, such as 40 pixels, 60 pixels, or other number based on the median size of the connected components. The minimum length requirement, based on threshold N, will be discussed in more detail below.

The concept of connected components will now be discussed. Two pixels are connected if they touch and also have the same or similar intensity value. Touching can be determined under 4-way connectivity (sides touching) or 8-way connectivity (sides or corners touching). Suitable algorithms for connected component labeling processes are known in the art and need not be described herein.

A group of pixels that are connected to each other is referred to as a connected component. In the top line of text in FIG. 2, for example, the foreground pixels forming the capital letter S is a single connected component. It is followed by another connected component corresponding to letter e, then another connected component corresponding to letter c, and so on.

All foreground pixels which are connected to each other form a single connected component. In the top line of text in FIG. 2, an underline intersects and is connected to characters g, j, left parenthesis, p, and right parenthesis. Also, the top part of the left parenthesis touches the top part of character 1. Thus, the foreground pixels of these characters and the underline form a single connected component. This particular type of connected component, referred to as a text-underline connected component, has at least one character that intersects an underline.

Referring again to FIG. 1, at block S102, a connected component (CC) analysis is performed on first image 12 to get a label image. This is performed in advance of any character recognition process that would identify specific characters in the image. The CC analysis is a labeling process that detects connected components in first image 12. The labeling process maintains an accounting of the detected connected components by generating a label image in which each of the foreground pixels is associated with a particular connected component. A label image is one in which a unique label or number is assigned to each connected component. The CC analysis at block S102 may label several, hundreds, or thousands of connected components, depending on the contents of the image being analyzed.

To facilitate the CC analysis, first image 12 could be a binary image. For example, a starting image may be a grayscale image which contains text. In the starting image, the center of characters may be white, but some of the edges may be gray. The starting image may be subjected to a binarization process to convert it to a binary image which is then subjected to the CC analysis at block S102. For example, a binarization process may include selecting a binarization threshold value, and then comparing the grayscale value of each pixel of the grayscale image to the binarization threshold value to determine a binary value (e.g., black or white) to be assigned to that pixel. Algorithms for selecting a binarization threshold value attempt to identify an optimal value that balances the need to preserve information likely to be of interest and to discard background noise. Remaining background noise, if any, may be removed using algorithms known in the art. Also, multiple binarization processes may be performed. After one binarization process, for example, the resulting image may be inverted to produce a negative image which is then subjected to a second binarization process to generate first image 12. Thereafter, CC analysis is performed on first image 12 to get a label image.

Still referring to FIG. 1, at block S104, the label image from S102 is analyzed to calculate a height (H), width (W), and stroke width (S) for each connected component (CC). The height and width can be the height and width of the bounding box of the connected component. The bounding box of a connected component is defined as the smallest rectangle that contains the pixels of the connected component. The size of any bounding box depends on the outer edges of its connected component. The height and width of the bounding box for one connected component may differ from the height and width of the bounding box for another connected component.

In the top line of text in FIG. 2, for example, the text-underline connected component (also shown in FIG. 3) is made up of underline 20 connected to various characters 18, namely g, j, left parenthesis, p, l, and right parenthesis. The bounding box for text-underline connected component 14 is the smallest rectangle that contains the connected foreground pixels of the underline, g, j, left parenthesis, p, l, and right parenthesis. The bounding box size does not depend on the letter S and other characters which are not part of the connected component. FIG. 3 shows that text-underline connected component 14 has bounding box vertical height H and bounding box horizontal width W.

Figure 5:
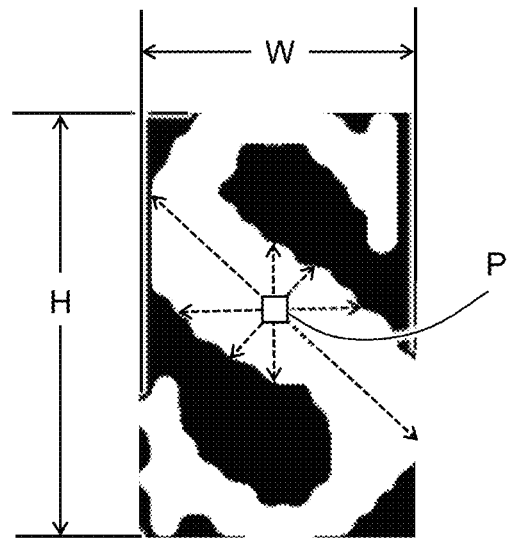
FIG. 5 shows a connected component corresponding to the character S from the first image of FIG. 2.

In the top line of text in FIG. 2, the bounding box for the connected component corresponding to uppercase letter S would be the smallest rectangle that contains the connected foreground pixels that define the letter S. FIG. 5 shows that this connected component has bounding box vertical height H and bounding box horizontal width W, which may differ in value from H and W of text-underline connected component 14 in FIG. 3.

As mentioned above, the stroke width ($S_{CC}$) for each connected component is calculated in block S104. For example, internal edge-to-edge widths in multiple directions may be calculated at each pixel within a connected component, and the median of all the internal edge-to-edge widths can be used as the stroke width ($S_{CC}$) of that connected component. The number of directions can be 2, 4, 8, or other number.

In FIG. 5, for example, internal edge-to-edge widths (represented by broken lines) in four directions are calculated at each pixel P. The minimum edge-to-edge width among the four values is taken to represent each pixel P. If it is assumed that the connected component has a total of 100 pixels, then there would be 100 minimum edge-to-edge widths. The stroke width ($S_{CC}$) of the connected component would be median of the 100 minimum edge-to-edge widths.

Alternatively, other algorithms may be used to calculate stroke width. Block S104 may use algorithms known in the art for calculating stroke width.

Referring again to FIG. 1, at block S106, a classification process is applied to each connected component to determine whether the connected component satisfies a character identification requirement. The character identification requirement is used to determine whether a connected component has characteristics of a character. The connected component is classified as a character if it satisfies the character identification requirement.

Figure 6:
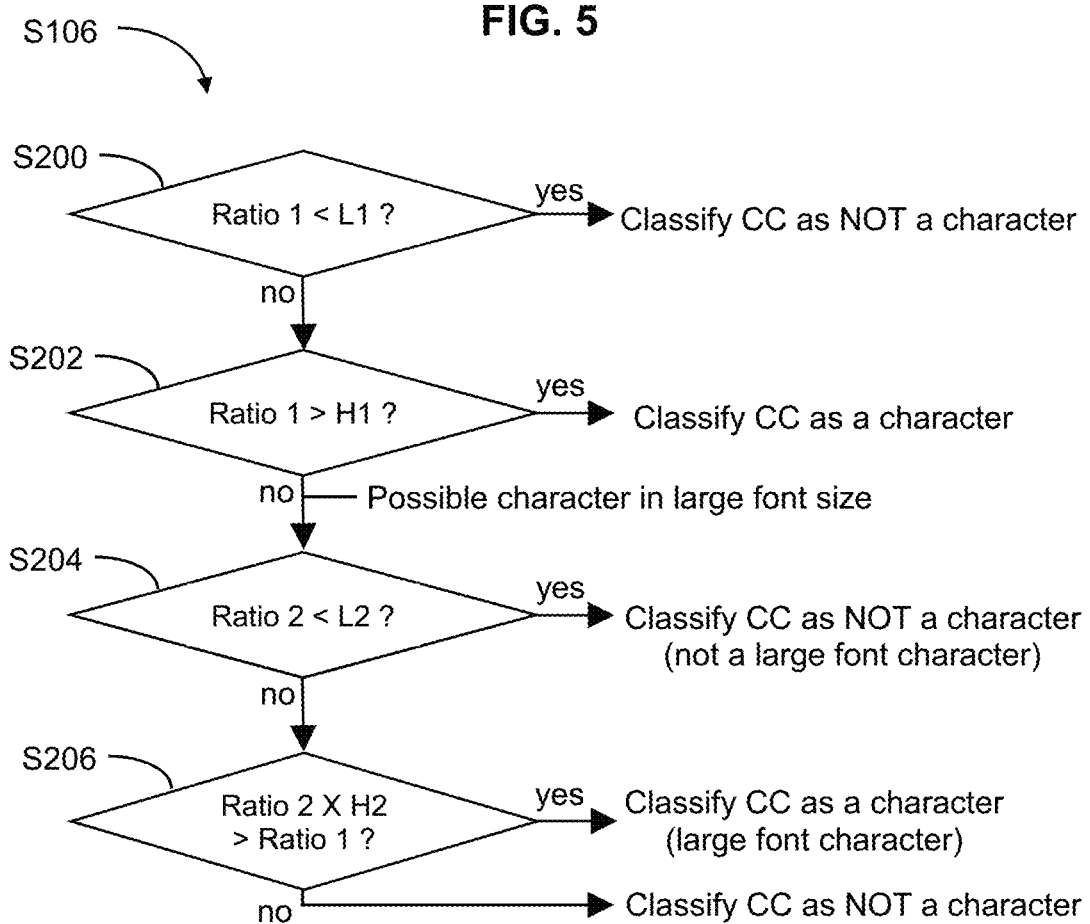
FIG. 6 is a flow diagram showing an example process for classifying connected components as either a character or not a character.

FIG. 6 illustrates an example classification process for block S106. An example character identification requirement includes a first ratio, which is calculated for all connected components. The first ratio, Ratio1, may be expressed as:

$$\text{Ratio1} = \max\left((H_{MED}/H_{CC}), (W_{MED}/W_{CC})\right) \qquad \text{Eq.1}$$

The "max" function returns the greater among ($H_{MED}/H_{CC}$) and ($W_{MED}/W_{CC}$). That is, Ratio1 equals ($H_{MED}/H_{CC}$) or ($W_{MED}/W_{CC}$), whichever is greater. H represents bounding box height, and W represents bounding box width. The term $H_{MED}$ is the median value among all bounding box heights in first image 12, and $H_{CC}$ is the bounding box height of the connected component currently being classified. The term median $W_{MED}$ is the median value among all bounding box widths in first image 12, and $W_{CC}$ is the bounding box width of the connected component currently being classified. The terms $H_{CC}$ and $W_{CC}$ represent the overall size of a particular connected component.

A very small value for Ratio1 means that the size of the connected component is excessively large relative to the median size, which indicates that the connected component is probably not a character. If Ratio1 is less than a low threshold value (L1), the connected component is classified as not a character. For example, L1 can be 0.05 or number less than 0.05. The above comparison of Ratio1 to L1 is shown in block S200 in FIG. 6.

If the result of block S200 is NO, Ratio1 is compared to a high threshold value (H1). This comparison may be easily understood by reviewing to FIG. 2, which shows input image 12 having a variety of connected components. Most connected components consist of a single character, which generally have bounding boxes that are much smaller than other connected components. Other connected components consist of a solitary underline that does not intersect a character, and those connected components would have a bounding box width ($W_{CC}$) which can be assumed to be greater than the median value among all bounding box widths ($W_{MED}$).

In FIG. 2, there is also a text-underline connected component that consists of an underline that intersects and is connected to characters, and that connected component would also have a $W_{CC}$ which can be assumed to be greater than $W_{MED}$. A large value for Ratio 1 means that the size of the connected component is smaller than the median size, which is what would be expected for characters. H1 can be selected such that when Ratio 1 is greater than H1, the connected component is classified as a character. For example, H1 can be 0.5, number greater than 0.5, or a number between 0.5 and 1. The above comparison of Ratio1 to H1 is shown in block S202 in FIG. 6. The connected component satisfies the character identification requirement when the result in block S202 is YES.

When the result in block S202 is NO, it is known that Ratio1 is between L1 and H1. In this situation, it is possible that the connected component is a character in a large font size (referred to as a large font character). A second ratio is calculated to help determine whether the connected component is a large font character. The second ratio evaluates the stroke width of the connected component relative to the median stroke width. The second ratio, Ratio2, can be expressed as:

$$\text{Ratio2} = S_{MED}/S_{CC} \qquad \text{Eq.2}$$

In Ratio2, the term $S_{MED}$ is the median value among stroke widths of all connected components in first image 12, and $S_{CC}$ is the stroke width of the connected component currently being classified. A very small value for Ratio2 means that the stroke width of the connected component is excessively large relative to the median stroke width, which indicates that the connected component is probably not a character. The connected component could be part of an illustration or the like, instead of being a large font character. To check whether the connected component is a large font character, Ratio2 can be compared to a threshold value. For example, if Ratio2 is less than a second low threshold value (L2), the connected component is classified as not a character. L2 can be 0.05 or positive number less than 0.05. The above comparison of Ratio2 to L2 is shown in block S204 in FIG. 6.

If the result of block S204 is NO, Ratio2 is compared to Ratio1 as a further test of whether the connected component is a large font character. Ratio2 can be considered as representing the relative stroke width size of the connected component, and Ratio1 can be considered as representing the relative overall size of the connected component. Generally, it is expected that a stroke width (Ratio2) is proportional to the overall size (Ratio1) of the connected component. This expectation may be used as follows. If Ratio 2 multiplied by a proportional factor (H2) is greater than Ratio1, then the connected component is classified as a character. For example, H2 can be 3 or other number from 2 to 3. The above comparison of Ratio2 to Ratio1 is shown in block S206 in FIG. 6. The connected component satisfies the character identification requirement when the result in block S206 is YES.

Referring again to FIG. 1, at block S108, an elongate shape standard is applied to the connected components to identify connected component candidates. The candidates are the connected components that are likely to contain horizontal lines that are to be removed to generate the second image. The candidates are expected to include text-underline connected component 14.

Figure 7:
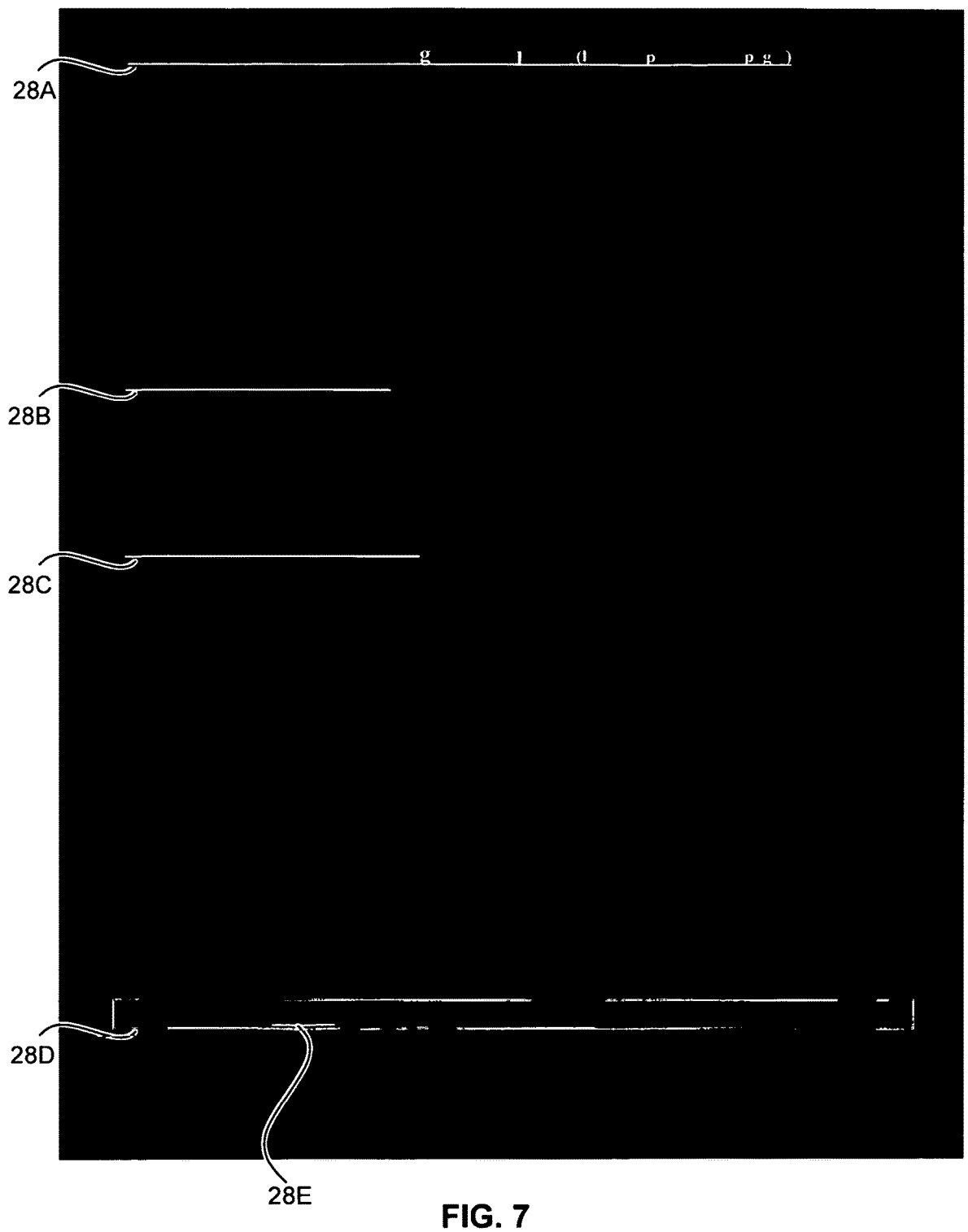
FIG. 7 shows example connected component candidates having elongate lines.

The process at block S108 analyzes the connected components in first image 12 to try to identify the connected components candidates labeled 28A-E in FIG. 2. FIG. 7 shows all connected components artificially removed except for candidate 28A-E so that the sizes and shapes of the candidates can be clearly seen.

The elongate shape standard may involve two requirements which are applied to each one of the connected components. The two requirements are: the ratio of bounding box width ($W_{CC}$) to height ($H_{CC}$) is relatively large, and the bounding box height ($H_{CC}$) is not much greater than the median height ($H_{MED}$). Any connected component that satisfies the elongate shape standard are identified as a connected component candidate.

Block S108 may calculate an elongation ratio and a comparative height ratio that correspond to the two requirements discussed above. The elongation ratio is defined as a ratio of the bounding box width ($W_{CC}$) to the bounding box height ($H_{CC}$). The comparative height ratio is defined as a ratio of the bounding box height ($H_{CC}$) to a median bounding box height ($H_{MED}$) of the connected components. These ratios may be expressed as:

$$\text{Elongation Ratio} = W_{CC}/H_{CC} \qquad \text{Eq.3}$$

$$\text{Comparative Height Ratio} = H_{MED}/H_{CC} \qquad \text{Eq.4}$$

Applying the elongate shape standard may include: (1) determining whether the elongation ratio is greater than an elongation ratio minimum value, and (2) determining whether the comparative height ratio is less than a height ratio maximum value. The elongation ratio minimum value can be 3 or other number greater than 3. The height ratio maximum value can be 5 or other number greater than 5. A connected component satisfies the elongate shape standard on condition that the elongation ratio is greater than the elongation ratio minimum value, and the comparative height ratio is less than the height ratio maximum value. Any connected component that satisfies the elongate shape standard is identified as a candidate.

Referring again to FIG. 1, at block S110, a table-type connected component is identified from among the connected component candidates. Identification can be performed by finding an ultra-long row of foreground pixels in a top portion of the bounding box of any of the connected component candidates 28A-E. The ultra-long row is defined as a row of foreground pixels that satisfies another minimum length requirement (an example of a "second minimum length requirement"). The minimum length requirement can be based on the median value among all bounding box widths ($W_{MED}$) multiplied by factor M. For example, a row of foreground pixels is identified as an ultra-long row when the row length equals M×$W_{MED}$. Factor M can be 3 or any number greater than 3, for example.

An example process for finding an ultra-long row is described below. Connected component candidate 28E is used in describing this process, although the same process is applied to all connected component candidates 28A-E in FIGS. 2 and 7.

Figure 8:
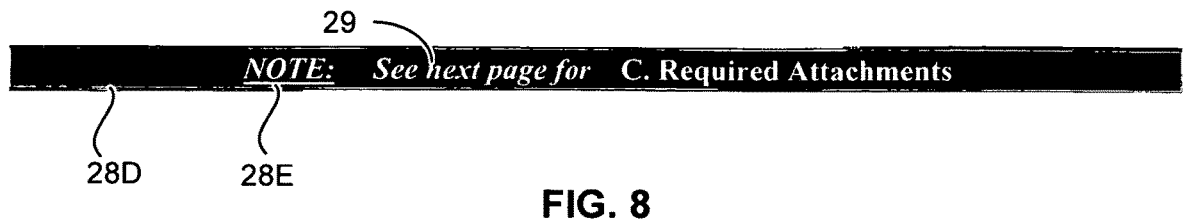
FIG. 8 shows an example table-type connected component from among the candidates in FIG. 7.

FIG. 8 shows the bounding box for connected component candidate 28D (see the rectangle in FIG. 7) together with other connected components (referred to as internal connected components) contained within the bounding box. Internal connected components 29 include various characters and connected component candidate 28E. Each foreground and background pixel has a column position and a row position. Column positions are analogous to horizontal X coordinates, and row positions are analogous to vertical Y coordinates. The algorithm at block S110 searches for an ultra-long row of foreground pixels within a top portion, such as the top quarter or top half, of the bounding box. Starting from the top row position of the bounding box, the algorithm counts the consecutive connected foreground pixels and records the greatest number (G) for that row position. If G is greater than $M \times W_{MED}$, the connected pixels are considered to be an ultra-long row, and the connected component candidate (28D in this example) is identified as a table-type connected component. All table-type connected components are excluded when generating the second image. For example, the foreground pixels of connected component candidate 28D in FIG. 7 are replaced with background pixels in the second image.

Referring again to FIG. 1, at block S112, a line-type connected component is identified from among the connected component candidates. This can be performed by analyzing the contents of the bounding box of the connected component candidate.

An example process for analyzing contents is described below. Connected component candidate 28E is used in describing this process, although the same process is applied any connected component candidate which has not already been identified as a table-type connected component in block S110.

The analysis in block S112 includes determining whether the connected component candidate satisfies a first criterion in which a total quantity of internal connected components contained within the bounding box of the connected component candidate satisfies a quantity requirement (Q). An internal connected component is defined as a connected component that (a) is not part of the connected component candidate and (b) is contained, at least partially, within the bounding box of connected component candidate. The connected component candidate satisfies the first criterion when the total number of internal connected components is greater than or equal to Q. For example, Q can be 2, 3, 4, or other number expected to distinguish a solitary underline from other types of connected components. Any connected component candidate that does not satisfy the first criterion is identified as a line-type connected component.

Figure 9:
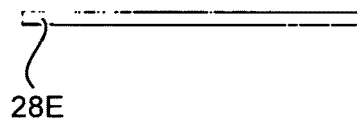
FIG. 9 shows an example line-type connected component from among the candidates in FIG. 7.

FIG. 9 shows the bounding box for connected component candidate 28E. Connected component candidate 28E corresponds to the underline below the word "NOTE" in FIG. 8. For candidate 28E, its bounding box contains a total of zero internal connected components, so this candidate will be identified as a line-type connected component. The same result will occur for candidates 28B and 28C shown in FIG. 7.

All line-type connected components are excluded when generating the second image. For example, the foreground pixels of connected component candidates 28B-D in FIG. 7 are replaced with background pixels in the second image.

Referring again to FIG. 1, at block S114, a text-underline connected component is identified from among the connected component candidates. A text-underline connected component is defined as a connected component that has at least one character that intersects an underline. Identification of a text-underline connected component can be performed by analyzing the contents of the bounding box of the connected component candidate. The analysis includes determining whether the connected component candidate satisfies the first criterion, as previously described for block S112. The analysis further includes determining whether the connected component candidate satisfies a second criterion in which a majority of the internal connected components satisfies the character identification requirement. The character identification requirement is used to determine whether a connected component has characteristics of a character, as described above for block S106. Any connected component candidate that satisfies the first criterion and the second criterion is identified as a text-underline connected component.

An example process for block S114 is described below. Connected component candidate 28A is used in describing this process, although the same process would be applied to any connected component candidate that has not already been identified as either a table-type connected component or a line-type connected component in previous blocks S110 and S112.

Figure 10:
FIG. 10 shows an example text-underline connected component from among the candidates in FIG. 7.

FIG. 10 shows the bounding box for connected component candidate 28A together with internal connected components 29 contained within the bounding box. As seen in FIG. 7, connected component candidate 28A is made up of only an underline and characters connected to the underline. As seen in FIG. 10, there are many internal connected components 29 contained within the bounding box, such as uppercase letter S, which are not connected to the underline. Only a portion of letter S is contained within the bounding box. The top part of letter S is outside the bounding box because the top boundary of the bounding box is defined by shorter characters connected to the underline.

Regarding the first criterion, there are more than thirty internal connected components contained within the bounding box of connected component candidate 28A. Recall that a connected component candidate satisfies the first criterion when the total number of internal connected components is greater than or equal to Q. Connected component candidate 28A satisfies the first criterion assuming that Q=10 is used. Of course, other values for Q may be used.

Regarding the second criterion, we assume for example that the total number of internal connected components is fifty, and that forty-five of the internal connected components satisfy the character identification requirement. That is, forty-five of the internal connected components are recognized as having characteristics of a character. Recall that a connected component candidate satisfies the second criterion when a majority of its internal connected components satisfies the character identification requirement. Thus, connected component candidate 28A satisfies the second criterion. The majority can be defined as greater than a threshold percentage (P). For example, P can be 50%, 70%, 80%, or 90%. Greater accuracy in detecting a text-underline connected component is expected with P larger than 50%.

With both the first and second criteria satisfied, connected component candidate 28A is identified a text-underline connected component. To generate the second image, only certain portions of text-underline connected components are excluded. Table-type and line-type connected components are excluded entirely, but text-underline connected components are handled differently when generating the second image. In text-underline connected components, one or more characters intersect the underline, so complete removal of the underline would also remove portions of those characters, resulting in partial characters. Partial characters are to be avoided since they may not be properly identified by a character recognition process, which may be performed on the second image. A character recognition process is intended identify a connected component as being a particular character, such as the j. The connected component for j might not be recognized as the letter j if the bottom part of the connected component is deleted during underline removal. To minimize the effects of partial characters, portions of the underline that intersect with characters (referred to as intersection areas) should remain in the second image. An example process for defining the intersection areas is described below.

Referring again to FIG. 1, at block S116, a reduced underline is established based on underline 20 of text-underline connected component 14. Underline 20 extends across the entire text-underline connected component 14, as shown in FIG. 3. FIG. 4 shows an enlarged portion 22 of underline 20. As previously discussed, underline 20 includes rows 26 of pixels (horizontal rows white pixels in this example) that do not satisfy a first minimum length requirement. The reduced underline excludes rows 26, which are also referred to as short rows herein.

Figure 11:
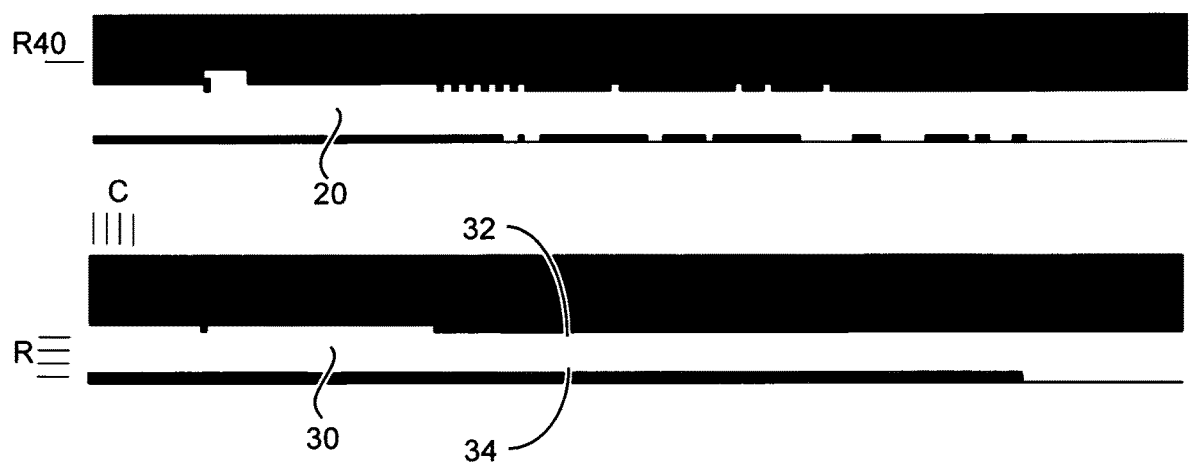
FIG. 11 shows a segment of an example underline and a corresponding segment of an example reduced underline.

FIG. 11 shows a portion of reduced underline 30 next to the corresponding portion of underline 20 to more clearly show the difference between the two. Reduced under 30 has fewer pixels than underline 20. Reduced underline 30 is a simplified reconstruction of underline 20. Each pixel of reduced underline 30 has a column position and a row position. Again, column positions are analogous to horizontal X coordinates, and row positions are analogous to vertical Y coordinates. Thus, there are a plurality of column positions C (indicated by vertical tick marks) along the width direction of reduced underline 30. There are a plurality of row positions R (indicated by horizontal tick marks) along the height direction of reduced underline 30. Only a few tick marks are illustrated for simplicity. At each column position, reduced underline 30 has top pixel 32 and bottom pixel 34.

FIG. 12 illustrates an example process for identifying all the top pixels of reduced underline 30. FIG. 12 shows only a portion of text-underline connected component 14 and a partial segment of underline 20. An algorithm begins at a row position which is expected to be above underline 20. For example, the algorithm may begin at middle row position R40, which is indicated in FIG. 11 but is not visible in FIG. 12. At the current row position, the algorithm counts the connected foreground pixels and records a number (CP) of consecutive pixels in that row. Consecutive pixels are defined as pixels that touch each other side-to-side in the current row position. If twenty-six pixels touch, then those pixels are associated with CP=26. If in the same row there are another five pixels that touch, then those pixels are associated with CP=5.

If the row, as represented by its CP value, is greater than N×$W_{MED}$, the connected pixels are considered to be a long row. For example, N can be a number greater than 1, a number from 1 to 2, or other number that would reliably detect pixels in an underline. The value of N should cause connected pixels of characters to be reliably disregarded. If the value of N is too small, then connected pixels of characters or background noise could be mistaken for connected pixels of an underline. If the value of N is too large, then connected pixels of a relatively short underline might be disregarded, which is not desired.

If the current row position is middle row position R40 (see FIG. 11), it is likely that none of the connected pixels will be identified as a long row. The algorithm proceeds to the next lower row position to search for a long row. If a long row is not found, the algorithm proceeds to the next lower row position, and so on. Eventually, the algorithm reaches a row position in which one or more long rows are found.

In this example, we assume that a long row is not found in row positions R12 and R11 in FIG. 12, so the algorithm proceeds to R10. In row position R10, there are consecutive pixels from C1 to C26, so these pixels correspond to CP=26. There are consecutive pixels from C29 to C33, so these pixels correspond to CP=5. Also, there are consecutive pixels from C36 to C55, so these pixels correspond to CP=20. Again, the minimum length requirement for a long row is that CP is greater than N×$W_{MED}$. In this example, we assume that (N×$W_{MED}$)=18, so two long rows 36 are found in row position R10. The consecutive pixels from C29 to C33 corresponds to short row 26 of pixels that does not satisfy the minimum length requirement.

When any long row is found, the algorithm associates a top row position for every column position in the long row, which column position has not previously been associated with a top row position. The top row position corresponds to the current row position. In this example, the current row position is R10, so column positions C1 to C26 and C36 to C55 are labeled with a top row position of R10. The row of connected pixels from C29 to C33 belong to a short row, so column positions C29 to C33 are not labeled or associated with a top row position.

Next, if there are still any column positions that have not been labeled with a top row position, the algorithm proceeds to the next lower row position. In this example, column positions C27 to C35 and C56 are not yet labeled, so the next lower row position, R9, is analyzed. In row position R9, long row 36 extends across C27 to C35 and C56, so each one of column positions C27 to C35 and C56 is labeled with a top row position of R9. Only a partial segment of underline 20 is shown in FIG. 12, so it is possible that other column positions (not visible in FIG. 12) are not yet labeled. The algorithm continues until all column positions of underline 20 are labeled with a top row position. Each column position and its top row position define a top pixel of underline 20. For example, the top pixel for column position C26 is located at top row position R10. The top pixel for column position C27 is located at top row position R9.

Even after all column positions are labeled, the algorithm continues to the next lower row until all long rows within underline 20 are identified. The algorithm may continue down to row position R1 if necessary. FIG. 13 shows a segment of reduced underline 30, which is established by assembling all the long rows that were identified. All top pixels 32 are marked with T for clarity.

Referring again to FIG. 1, at block S118, all pixels corresponding to reduced underline 30 are removed from first image 12. The result can be seen in FIGS. 14A and 14B. FIG. 14A shows a portion of text-underlined connected component 14 from first image 12 before removal of pixels. FIG. 14A shows intersection area 38 at which character j in text-underline connected component 14 coincides with the pixels of reduced underline 30.

FIG. 14B shows the same portion of text-underlined connected component 14 of FIG. 14A after completion of block S118. All pixels corresponding to reduced underline 30 have been removed. Background pixels (black pixels in this example) are placed at locations corresponding to the pixels of reduced underline 30, which results in a partial version of character j. The partial version of j might not be recognized by a character recognition process. Of course, there are other intersection areas at which characters g, left parenthesis, p, and right parenthesis coincide with reduced underline 30. Partial versions of these characters would also be created when all pixels corresponding to the reduced underline 30 are removed from first image 12.

Next at block S120, all intersection areas are restored to minimize the effects of partial characters. The restoration process includes blocks S122 to S126, which are performed for every one of the column positions of reduced underline 30. At block S122, top pixel 32 of the current column position is known from block S116. Next at block S124, it is determined whether a character pixel group is disposed above and adjacent to the top pixel. A character pixel group is defined as P foreground pixels arranged vertically in the current column position. For example, P can be 2 or other number that reliably detects characters above and adjacent to the underline. As a further example, P can be any number from 2 to 6. If P is too large (P>6, for example), a short character column portion could be disregarded, which is not desired. For example, in FIG. 14A, short character column portion 40 of character j could be disregarded if P is too large. If P is too small (P=1, for example), background noise could be mistaken for a character column portion, which is also not desired.

FIG. 15 illustrates the process of block S124. FIG. 15 shows a close-up of the bottom portion of FIG. 14A. Top pixels 32 of reduced underline 30 are marked T for clarity. In this example, all the top pixels are at row position R10. For each one of column positions C1278 to C1303, an algorithm determines whether a character pixel group is disposed above and adjacent to the top pixel in the column position. When using P=2, the algorithm will search for a character column portion having two pixels disposed above and adjacent to the top pixel of the current column position. For every column position, the algorithm will determine whether a foreground pixel is present in row position R11 adjacent to the top pixel. If there is no foreground pixel in R11, the result is NO at block S124 for the current column position. If there is a foreground pixel in R11, the algorithm will determine whether there is a foreground pixel present in row position R12. If there is no foreground pixel in R12, the result is NO at block S124 for the current column position. If there is a foreground pixel in R12, the result is YES at block S124 for the current column position.

At block S124, a NO result means that a character is not likely to be disposed above and adjacent to the underline. With a result of NO, the process proceeds to block S126, where no restoration is performed.

At block S124, a YES result means that a character is likely to be disposed above and adjacent to the underline. With a result of YES, the process proceeds to block S128, where an intersection column at the current column position is restored. An intersection column is defined as pixels of reduced underline 30, which pixels are arranged vertically in the current column position.

FIG. 14C shows a single intersection column 42 restored. The intersection column which is restored is located at column position C1281 in FIG. 15. In column position C1281, there is a character pixel group (marked #) disposed above and adjacent to the top pixel (marked T).

FIG. 14D shows all intersection columns 42 for character j restored in second image 44. FIG. 14D shows de-underlined connected component 46 in which all intersection columns for character j have been restored. The intersection columns which are restored are located at column positions C1281 to C1283 and C1288 to C1296 in FIG. 15. In each of those column positions, there is a character pixel group (marked #) disposed above and adjacent to the top pixel (marked T). De-underlined connected component 46 is surrounded by background pixels 47 (FIG. 17) corresponding in position to areas 49 (FIG. 14A) in reduced underline 30 adjacent to intersection area 38.

Blocks S122 to S124 are performed for all column positions across reduced underline 30. In this way, restoration is performed for all of the other intersection areas at which characters g, left parenthesis, p, and right parenthesis coincide with reduced underline 30.

The process of blocks S118 and S120 may be reversed so that restoration is not performed in actual practice of the method. That is, a modified version of block S120 is performed, followed by a modified version of block S118. In the modified version of block S118, only some of the pixels corresponding to reduced underline 30 are removed. This differs from the above description of the original version of block S118 in which all pixels corresponding to reduced underline 30 are removed.

Figure 16:
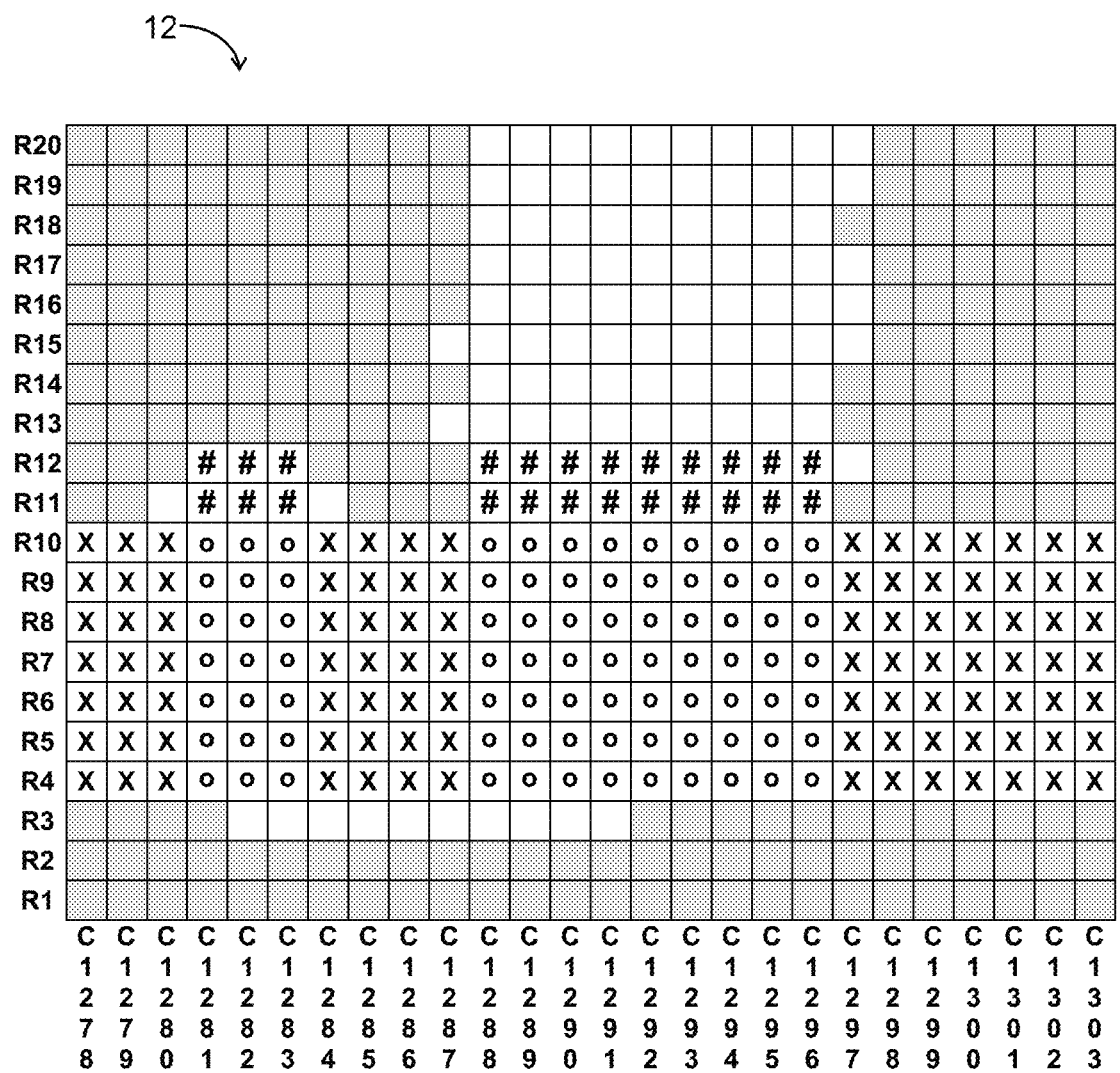
FIG. 16 shows columns of pixels from FIG. 15 that are identified for removal.

In the modified version of block S120, all of the intersections areas are defined according to the process described above. For every column position across reduced underline 30, it is determined whether a character pixel group is disposed above and adjacent to the top pixel. With a NO result, the column of pixels of reduced underline 30 in the current column position is identified for removal from text-underline connected component 14 of first image 12. FIG. 16 shows a portion of first image 12 in which character pixel groups (marked #) have been identified using P=2, as described in FIG. 15. The result is NO for the column of pixels marked X, so those columns are identified for removal. With a YES result, the column of pixels (marked O) for reduced underline 30 in the current column position is not identified for removal. This differs from the original version of block S120 in which restoration was performed for a YES result. The column positions marked O are examples of intersection columns that form intersection area 38 in FIG. 14A.

Figure 17:
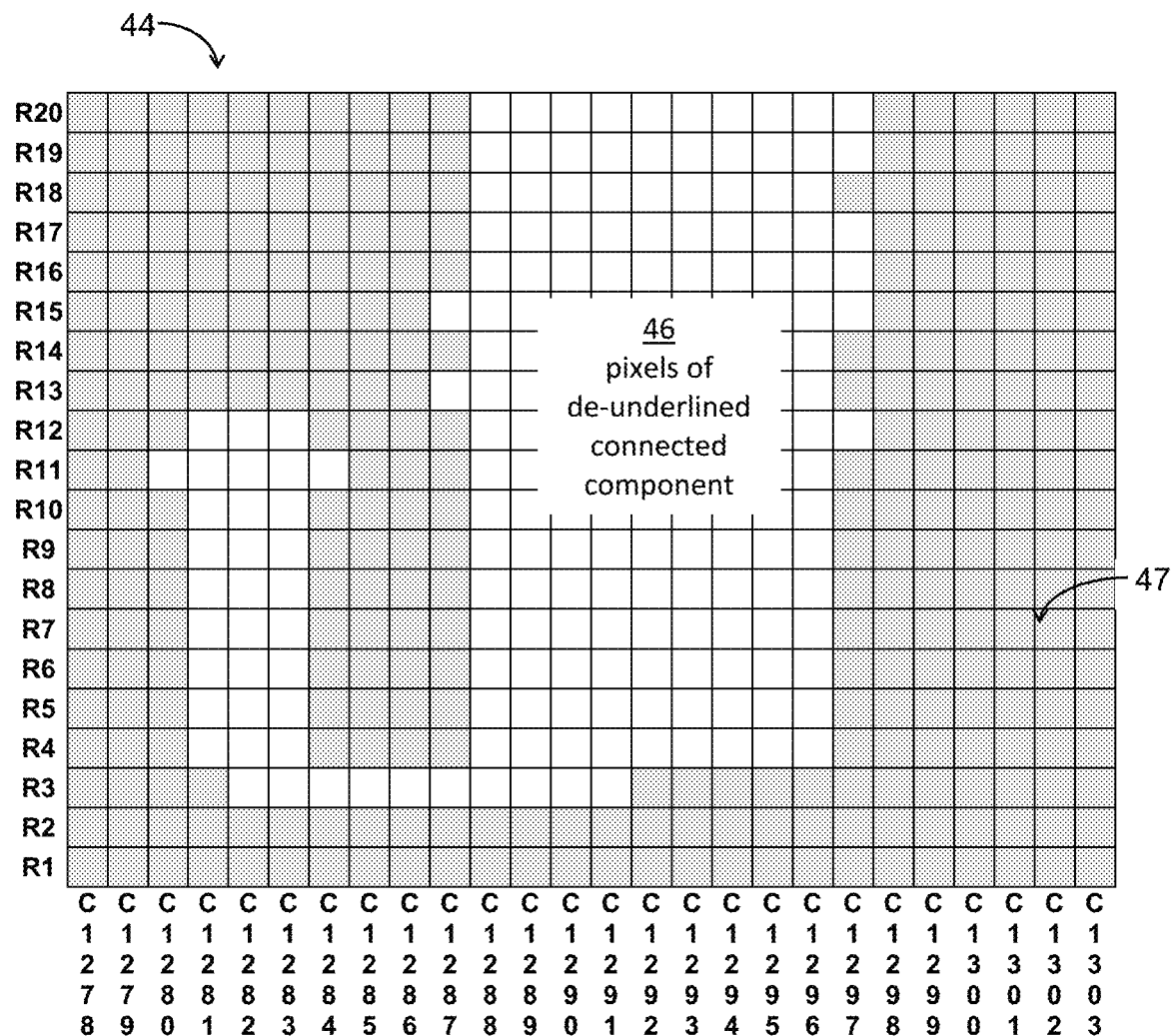
FIG. 17 shows the identified columns of pixels from FIG. 16 having been removed.

Next, the modified version of block S118 is performed. After all column positions are analyzed, all pixel columns identified for removal are removed from text-underline connected component 14 to form de-underlined connected component 46. FIG. 17 shows a portion of second image 44 in which pixel columns identified for removal (marked X in FIG. 16) have been removed. FIG. 17 shows only the result of this process for character j.

Figure 18:
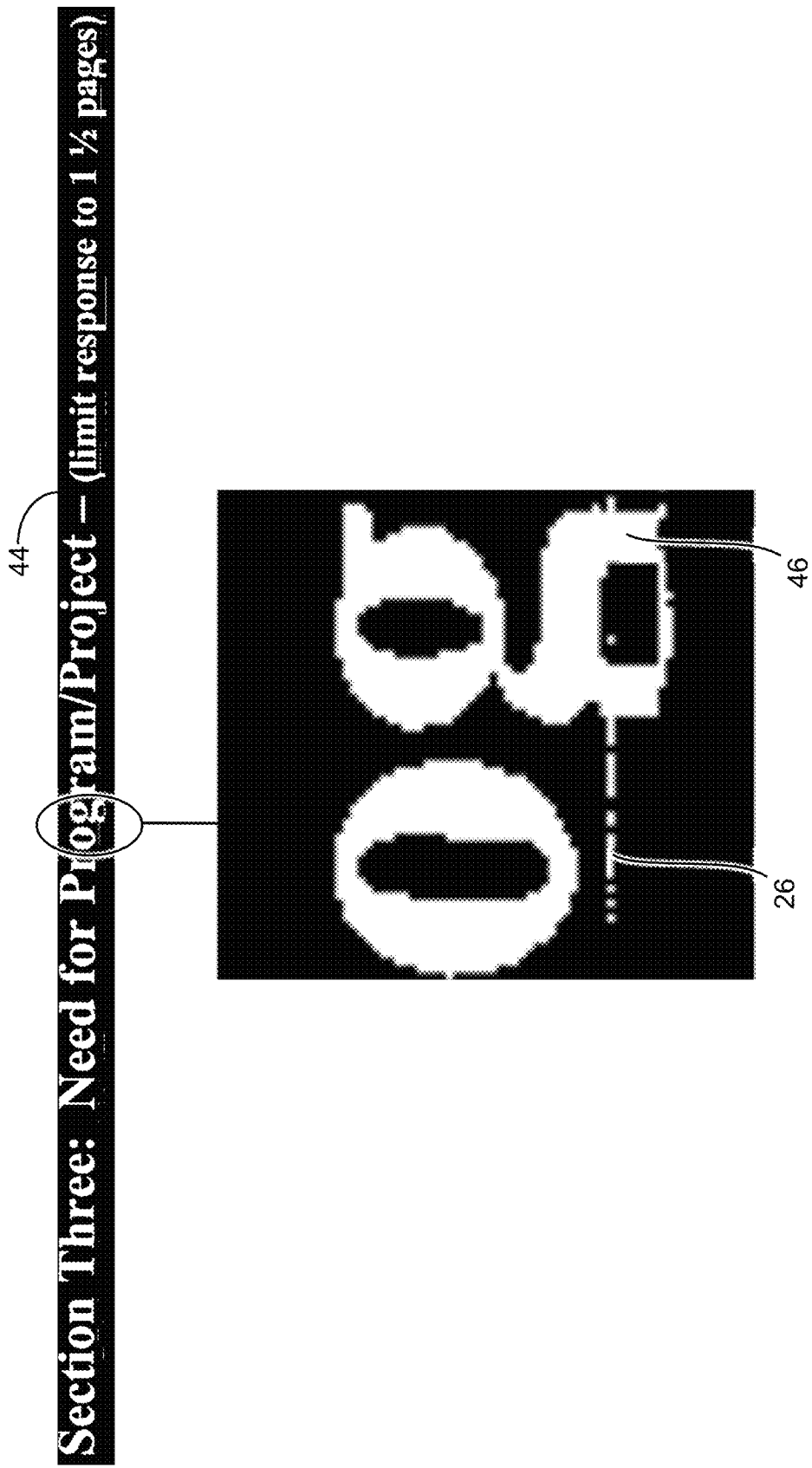
FIG. 18 shows an example result of a line removal process.

FIG. 18 shows the result of this process at region 16 of FIG. 2. As explained above, reduced underline 30 is defined from long rows 36 detected in underline 20. Short rows 26 in underline 20 are omitted from reduced underline 30. Thus, short rows 26 of pixels will remain even after pixels of reduced underline 30 are removed. A noise removal algorithm, as known in the art, may be applied to generate a cleaner version of second image 44 if desired. A cleaner version may improve accuracy and efficiency of a subsequent character recognition processes performed on second image 44.

Figure 19:
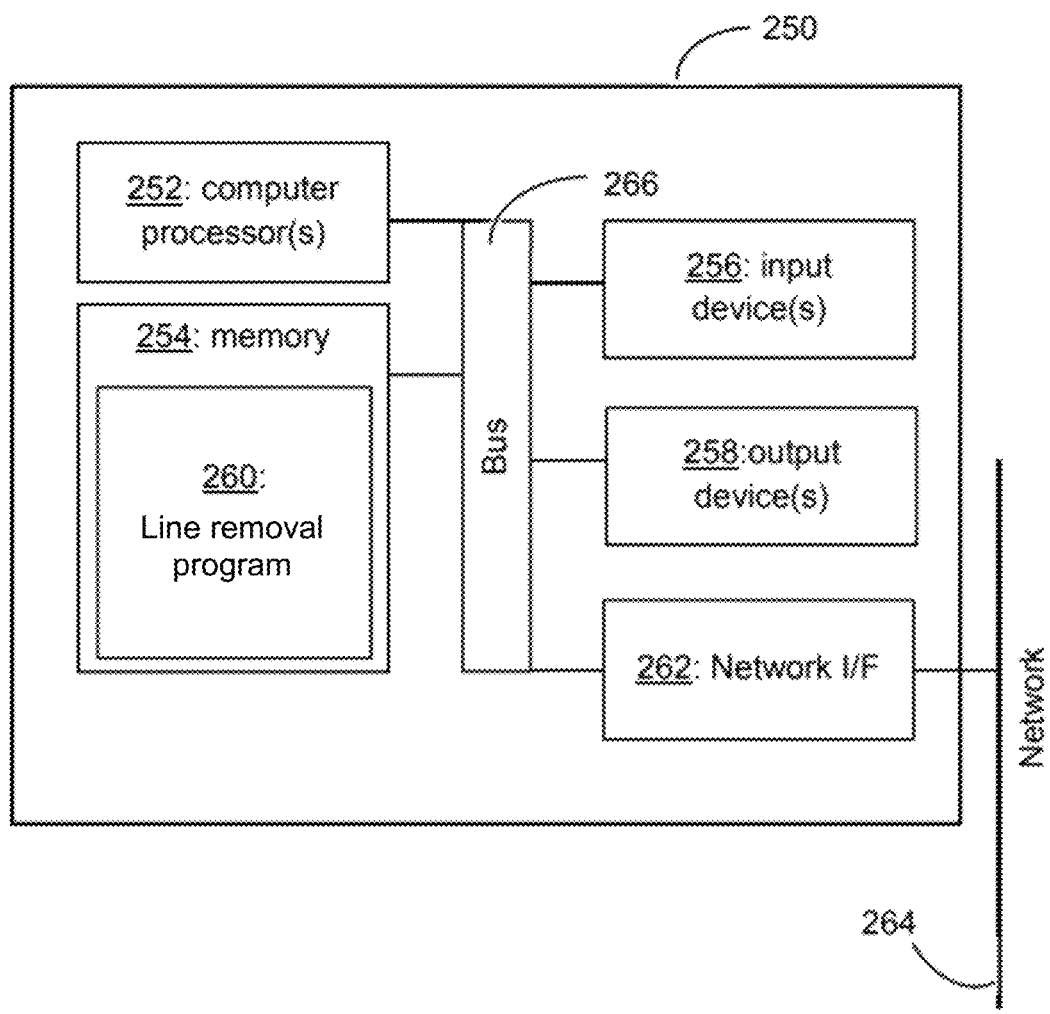
FIG. 19 is a schematic block diagram of an example apparatus configured to perform the processes of the preceding figures.

FIG. 19 shows example apparatus 250 configured to perform method 10 of FIG. 1. Apparatus 250 can be a server, computer workstation, personal computer, laptop computer, tablet, smartphone, facsimile machine, printing machine, multi-functional peripheral (MFP) device that has the functions of a printer and scanner combined, or other type of machine that includes one or more computer processors and memory.

Apparatus 250 includes one or more computer processors 252 (CPUs), one or more computer memory devices 254, one or more input devices 256, and one or more output devices 258. The one or more computer processors 252 are collectively referred to as processor 252. Processor 252 is configured to execute instructions. Processor 252 may include integrated circuits that execute the instructions. The instructions may embody one or more software modules for performing method 10. The one of more software modules are collectively referred to as line removal program 260.

The one or more computer memory devices 254 are collectively referred to as memory device 254. Memory device 254 includes any one or a combination of random-access memory (RAM) modules, read-only memory (ROM) modules, and other electronic devices. Memory device 254 may include mass storage device such as optical drives, magnetic drives, solid-state flash drives, and other data storage devices. Memory device 254 includes a non-transitory computer readable medium that stores line removal program 260.

The one or more input devices 256 are collectively referred to as input device 256. Input device 256 can allow a user to enter data and interact with apparatus 250. Input device 256 may include any one or more of a keyboard with buttons, touch-sensitive screen, mouse, electronic pen, and other types of devices. Input device 256 may be used to create a first image 12. Input device 256 may include an optical scanner having a camera and light source and which is configured to scan a document page to create first image 12 used in method 10.

The one or more output devices 258 are collectively referred to as output device 258. Output device 258 may include a liquid crystal display, projector, or other type of visual display device. Output device 258 may be used to display first image 12 and/or second image 44. Output device 258 may include a printer that prints first image 12 and/or second image 44.

Apparatus 250 includes network interface (I/F) 262 configured to allow apparatus 250 to communicate with other machines through network 264, such as a local area network (LAN), a wide area network (WAN), the Internet, and telephone communication carriers. Network I/F 262 may include circuitry enabling analog or digital communication through network 264. For example, network I/F 262 may be configured to receive first image 12. Network I/F 262 may be configured to transmit second image 44. The above-described components of apparatus 250 are communicatively coupled to each other through communication bus 266.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method for underline removal, the method comprising:
   receiving a first image containing a plurality of connected components, the plurality of connected components comprising a text-underline connected component, the text-underline connected component comprising foreground pixels defining a character that intersects an underline, the underline comprising a row of foreground pixels that does not satisfy a minimum length requirement;
   establishing a reduced underline, which is a partial copy of the underline, that excludes the row of foreground pixels, there being a plurality of column positions along the reduced underline, the reduced underline comprising a top pixel and a bottom pixel at each of the column positions;
   locating, in the reduced underline, an intersection area at which the character in the text-underline connected component coincides with the reduced underline; and
   generating a second image containing a de-underlined connected component based on the located intersection area, the de-underlined connected component comprising foreground pixels corresponding in position to the located intersection area in the reduced underline, the de-underlined connected component surrounded by background pixels corresponding in position to areas in the reduced underline adjacent to the located intersection area.

2. The method of claim 1, further comprising:
   determining, for each of the column positions along the reduced underline, whether there is a character pixel group disposed above and adjacent to the top pixel of the column position,
   wherein
   the located intersection area comprises a plurality of intersection columns,
   each of the intersection columns is located at an intersection column position, from among the column positions along the reduced underline, in which it was determined that a character pixel group is disposed above and adjacent to the top pixel at the intersection column position, and
   each of the intersection columns starts at the top pixel at the intersection column position and ends at the bottom pixel at the intersection column position.

3. The method of claim 1, wherein the row of foreground pixels does not satisfy the minimum length requirement in that the row is less than N times a median bounding box width of the connected components in the first image, and N is at least 2.

4. The method of claim 1, further comprising:
   identifying a plurality of long rows of foreground pixels in the underline to form the reduced underline, each of the long rows satisfying the minimum length requirement,
   wherein the reduced underline is defined by the plurality of long rows collectively.

5. The method of claim 1, further comprising:
   selecting connected component candidates from among the connected components in the first image, the text-underline connected component being one of the connected component candidates, the selecting comprising:
     applying an elongate shape standard to each of the connected components, and
     identifying the connected component candidates as being the connected components that satisfy the elongate shape standard.

6. The method of claim 5, wherein each of the connected components in the first image has a bounding box height, a bounding box width, an elongation ratio defined as a ratio of the bounding box width to the bounding box height, and a comparative height ratio defined as a ratio of the bounding box height to a median bounding box height of the connected components,
   wherein the applying of the elongate shape standard includes determining whether the elongation ratio of the connected component is greater than an elongation ratio minimum value, and determining whether the comparative height ratio is less than a height ratio maximum value, and wherein the connected component satisfies the elongate shape standard on condition that both the elongation ratio is greater than the elongation ratio minimum value and the comparative height ratio is less than the height ratio maximum value.

7. The method of claim 5, further comprising:

identifying the text-underline connected component from among the connected component candidates by analyzing contents of the bounding boxes of the connected component candidates.

8. The method of claim 7, wherein the analyzing of contents comprises:

determining whether the connected component candidate satisfies a first criterion in which a total quantity of internal connected components contained within the bounding box of the connected component candidate satisfies a quantity requirement, determining whether the connected component candidate satisfies a second criterion in which a majority of the internal connected components satisfies a character identification requirement, and identifying the text-underline connected component as being the connected component candidate that satisfies the first criterion and the second criterion.

9. The method of claim 8, further comprising:

identifying a line-type connected component as being the connected component candidate that does not satisfy the first criterion, wherein the second image excludes the line-type connected component.

10. The method of claim 5, further comprising:

identifying a table-type connected component from among the connected component candidates by finding an ultra-long row of foreground pixels in a top portion of the bounding box of one of the connected component candidates, the ultra-long row satisfying a second minimum length requirement, wherein the second image excludes the table-type connected component.

11. The method of claim 10, wherein the ultra-long row satisfies the second minimum length requirement in that the ultra-long row is M times a median bounding box width of the connected components in the first image, and M is at least 3.

12. An apparatus for underline removal, the apparatus comprising:

a processor; and a memory device in communication with the processor, the memory device storing instructions;

wherein the processor is configured to remove underlines from an image by performing a process according to the stored instructions, and the process comprises:

receiving a first image containing a plurality of connected components, the plurality of connected components comprising a text-underline connected component, the text-underline connected component comprising foreground pixels defining a character that intersects an underline, the underline comprising a row of foreground pixels that does not satisfy a minimum length requirement;

establishing a reduced underline, which is a partial copy of the underline, that excludes the row of foreground pixels, there being a plurality of column positions along the reduced underline, the reduced underline comprising a top pixel and a bottom pixel at each of the column positions;

locating, in the reduced underline, an intersection area at which the character in the text-underline connected component coincides with the reduced underline; and generating a second image containing a de-underlined connected component based on the located intersection area, the de-underlined connected component comprising foreground pixels corresponding in position to the located intersection area in the reduced underline, the de-underlined connected component surrounded by background pixels corresponding in position to areas in the reduced underline adjacent to the located intersection area.

13. The apparatus of claim 12, wherein the process performed by the processor further comprises:

determining, for each of the column positions along the reduced underline, whether there is a character pixel group disposed above and adjacent to the top pixel of the column position, wherein the located intersection area comprises a plurality of intersection columns, each of the intersection columns is located at an intersection column position, from among the column positions along the reduced underline, in which it was determined that a character pixel group is disposed above and adjacent to the top pixel at the intersection column position, and each of the intersection columns starts at the top pixel at the intersection column position and ends at the bottom pixel at the intersection column position.

14. The apparatus of claim 12, wherein the row of foreground pixels does not satisfy the minimum length requirement in that the row is less than N times a median bounding box width of the connected components in the first image, and N is at least 2.

15. The apparatus of claim 12, wherein the process performed by the processor further comprises:

identifying a plurality of long rows of foreground pixels in the underline to form the reduced underline, each of the long rows satisfying the minimum length requirement, wherein the reduced underline is defined by the plurality of long rows collectively.

16. The apparatus of claim 12, wherein the process performed by the processor further comprises:

selecting connected component candidates from among the connected components in the first image, the text-underline connected component being one of the connected component candidates, the selecting comprising:

applying an elongate shape standard to each of the connected components, and identifying the connected component candidates as being the connected components that satisfy the elongate shape standard.

17. The apparatus of claim 16, wherein each of the connected components in the first image has a bounding box height, a bounding box width, an elongation ratio defined as a ratio of the bounding box width to the bounding box height, and a comparative height ratio defined as a ratio of the bounding box height to a median bounding box height of the connected components, wherein the applying of the elongate shape standard includes determining whether the elongation ratio of the connected component is greater than an elongation ratio minimum value, and determining whether the comparative height ratio is less than a height ratio maximum value, and wherein the connected component satisfies the elongate shape standard on condition that both the elongation ratio is greater than the elongation ratio minimum value and the comparative height ratio is less than the height ratio maximum value.

18. The apparatus of claim 16, wherein the process performed by the processor further comprises:

identifying the text-underline connected component from among the connected component candidates by analyzing contents of the bounding boxes of the connected component candidates.

19. The apparatus of claim 18, wherein the analyzing of contents comprises:

determining whether the connected component candidate satisfies a first criterion in which a total quantity of internal connected components contained within the bounding box of the connected component candidate satisfies a quantity requirement, determining whether the connected component candidate satisfies a second criterion in which a majority of the internal connected components satisfies a character identification requirement, and identifying the text-underline connected component as being the connected component candidate that satisfies the first criterion and the second criterion.

20. A non-transitory computer-readable medium having stored thereon computer readable instructions that, when executed by a processor of an apparatus, cause the apparatus to perform a process for removing underlines from an image, the process comprising:

receiving a first image containing a plurality of connected components, the plurality of connected components comprising a text-underline connected component, the text-underline connected component comprising foreground pixels defining a character that intersects an underline, the underline comprising a row of foreground pixels that does not satisfy a minimum length requirement;

establishing a reduced underline, which is a partial copy of the underline, that excludes the row of foreground pixels, there being a plurality of column positions along the reduced underline, the reduced underline comprising a top pixel and a bottom pixel at each of the column positions;

locating, in the reduced underline, an intersection area at which the character in the text-underline connected component coincides with the reduced underline; and generating a second image containing a de-underlined connected component based on the located intersection area, the de-underlined connected component comprising foreground pixels corresponding in position to the located intersection area in the reduced underline, the de-underlined connected component surrounded by background pixels corresponding in position to areas in the reduced underline adjacent to the located intersection area.

* * * * *